(12) United States Patent  
Loen et al.

(10) Patent No.: US 7,942,991 B1  
(45) Date of Patent: *May 17, 2011

(54) LAMINATING POLYESTER ONTO METAL SUBSTRATE

(76) Inventors: Mark V. Loen, Maricopa, AZ (US); James E. Velliky, Jacksonville, FL (US)

(*) Notice: Subject to any disclaimer, the term of this patent is extended or adjusted under 35 U.S.C. 154(b) by 141 days.

This patent is subject to a terminal disclaimer.

(21) Appl. No.: 12/388,011

(22) Filed: Feb. 18, 2009

Related U.S. Application Data

(63) Continuation-in-part of application No. 11/530,723, filed on Sep. 11, 2006, now Pat. No. 7,678,213.

(60) Provisional application No. 60/716,053, filed on Sep. 13, 2005.

(51) Int. Cl.  
*B32B 37/00* (2006.01)

(52) U.S. Cl. ............ 156/64; 156/82; 156/259; 156/267; 156/282; 156/324

(58) Field of Classification Search .............. 156/64, 156/82, 250, 259, 267, 282, 308.2, 309.9, 156/322, 324, 555, 582, 583.1  
See application file for complete search history.

(56) References Cited

U.S. PATENT DOCUMENTS

| | | | | |
|---|---|---|---|---|
| 3,679,513 | A * | 7/1972 | Addinall et al. | 156/308.8 |
| 5,059,460 | A * | 10/1991 | Heyes et al. | 428/35.3 |
| 5,093,208 | A * | 3/1992 | Heyes et al. | 428/623 |
| 5,149,389 | A * | 9/1992 | Heyes et al. | 156/272.4 |
| 5,318,648 | A * | 6/1994 | Heyes et al. | 156/244.24 |
| 5,330,605 | A * | 7/1994 | Tanaka et al. | 156/309.9 |
| 5,407,702 | A * | 4/1995 | Smith et al. | 427/211 |
| 5,679,200 | A * | 10/1997 | Newcomb et al. | 156/308.2 |
| 5,695,579 | A * | 12/1997 | Rowland | 156/64 |
| 5,919,517 | A * | 7/1999 | Levendusky et al. | 427/211 |
| 6,017,599 | A * | 1/2000 | Sakamoto et al. | 428/35.8 |
| 6,080,260 | A * | 6/2000 | Yasunaka et al. | 156/229 |
| 6,164,358 | A * | 12/2000 | Kaguma et al. | 156/494 |
| 6,200,409 | B1 * | 3/2001 | Tanaka et al. | 156/309.9 |
| 7,678,213 | B1 * | 3/2010 | Loen et al. | 156/64 |

* cited by examiner

*Primary Examiner* — James Sells

(57) ABSTRACT

The present invention is a laminating process which is directed toward economical production methods for scalable amounts of production which develop properties suitable for a broad based product line. In particular, the product is capable of important key components of commercial properties such as adhesion, scratch resistance, chemical inertness, and bending without failure.

19 Claims, 7 Drawing Sheets

LAMINATING POLYESTER ONTO METAL SUBSTRATE

CROSS REFERENCE TO RELATED APPLICATIONS

This application is a continuation in part of U.S. application Ser. No. 11/530,723 now U.S. Pat. No. 7,678,213 filed on Sep. 11, 2006 which claims the benefit of U.S. Provisional Application No. 60/716,053 filed on Sep. 13, 2005. Both referenced applications are incorporated herein by reference.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION (1) Field of the Invention

This application is directed to laminating films onto metal substrates. In particular, laminating polyester films onto preheated metal substrates through a chemical bond in a commercially viable process whereby multiple desirable commercial properties are simultaneously developed.

(2) Description of Related Art

Others have described laboratory processing steps related to putting films onto metal surfaces. For example, U.S. Pat. No. 5,330,605 describes preheating a metal strip and then laminating a biaxially oriented copolyester resin film. However, a post treating step has been found to be necessary for permanent commercial adhesion in many important markets, and the post treating step substantially destroys the crystallinity of an oriented polyester film. Since crystallinity provides important commercial pencil hardness and toughness properties, the hardness and toughness of the film will be lowered in actual use.

U.S. Pat. No. 5,149,389 and U.S. Pat. No. 5,093,208 describes a thermal laminating process where a metal strip is preheated, laminated, post heated, and quenched in water. The process targets the creation of a non-crystalline polyester that is generally useful for can making. Unfortunately, the lack of crystallinity is a distinct disadvantage in creating desirable commercial characteristics such as pencil hardness and toughness in bending.

U.S. Pat. No. 5,318,648 describes a thermal laminating process where the cooling process is specifically performed to avoid creating crystallinity in the laminate film. This has similar problems with pencil hardness and toughness properties just described.

U.S. Pat. No. 3,679,513 describes a thermal laminating process for a polyethylene. The process does not describe pretreating the metal surface by raising the surface energy nor does it describe methods of creating crystallinity in the finished laminate film to develop pencil hardness or bending toughness. Polyethylene is not known to develop desirable commercial properties and the low melting point of polyethylene is undesirable for many markets when compared to other polymers.

U.S. Pat. No. 5,679,200 describes a thermal laminating process for applying a film to a metal strip where the laminating rolls provide a specific force. The patent is directed toward a specific laminating nip force related to avoiding the pickup of film onto the nip rolls. The process does not describe pretreating the metal surface by raising the surface energy nor does it describe methods of creating crystallinity in the finished laminate film.

U.S. Pat. No. 5,695,579 describes a thermal laminating process where the polymer coated metal is rapidly and immediately quenched after post treating to ensure that the coating is amorphous. The described process is designed to avoid creating crystallinity in the finished laminate film. The process does not describe pretreating the metal surface by raising the surface energy nor does it describe methods of creating crystallinity in the finished laminate film.

Others have worked on important commercial—technical issues such as the eliminating entrapped air between the film and metal substrate. For example, U.S. Pat. No. 6,200,409 describes an improved laminating process which works on eliminating air bubbles by heating the laminating nip rolls and preheating the film prior to laminating. Similarly, U.S. Pat. No. 6,164,358 describes efforts at reducing air entrapment by using a support roll with a projected film angle. In the later disclosure, a commercially acceptable amount is defined as an 8% area covered by entrapped air. Others, such as U.S. Pat. No. 5,679,200, have attempted to handle trapped air through increased nip forces.

Important commercial markets are open to lamination provided that acceptable adhesion, pencil hardness, bending toughness, and corrosion protection can be simultaneously achieved. These markets are currently served by the pre-painted coil coated industry. Typical products include the following:

Building and Construction Products such as:
  a. Roofing and Siding
  b. Exterior Accessories
  c. Structural and Mechanical
  d. Interior Components
  e. Manufactured Housing
  f. Garage Doors
  g. Doors and Windows Transportation Products such as:
  a. Passenger Cars, Vans, and Light Trucks
  b. Trucks and Semi-Trailers
  c. Buses
  d. Travel Trailers and Recreational Vehicles Business and Consumer Products such as:
  a. Large and Small Appliances
  b. Electronics
  c. Water Heaters and Water Softeners
  d. Heating and Cooling Equipment
  e. Home and Office Furniture
  f. Window Equipment
  g. Toys and Sporting Goods
  h. Fixtures and Shelving
  i. Lighting Containers and Packaging Products such as:
  a. Cans, Ends, Tabs, Crowns, & Closures
  b. Barrels, Drums, and Pails
  c. Strapping and Seals
  d. Draw and Ironed can bodies Other/Miscellaneous Products such as:
  a. Machinery and Industrial Equipment
  b. Electrical Equipment
  c. Signs and Displays It is important to note that the referenced patents have not resulted in a commercially viable high production thermal laminating line in the US. The difficulties in simultaneously scaling up production, creating an economically viable process, and developing suitable commercial properties have been strong barriers to the actual implementation of a laminating process. The previous efforts by others have been lacking in important technical aspects of cooperation between the processing steps, economical viability, and suitable commercial properties.

Current high production laminating methods on thicker metal substrates, i.e. 0.005" and above, are primarily directed at utilizing press on adhesives which are applied by a roller onto the metal substrate, and the adhesive is dried in an oven prior to the laminating step. This process is commonly part of a commercial coil paint line. The application of the film to the metal substrate is generally done close to ambient temperatures. The adhesive is separately applied to the metal substrate and is usually not a part of the film. After the film is applied to the metal strip, there is not an additional post heating step to create additional, superior bonding.

It is important that high production thermal laminating methods have little or no entrapped air between the metal substrate and the film. Entrapped air causes thinning of the coating at an unpredictable amount. In particular, when a formed part is bent and the bend occurs where an air bubble exists in the coating, an increased likelihood of failure results. Air entrapment is a serious issue when the air bubble size is significant relative to the coating thickness, and the frequency is high. It is also visually disturbing at an 8 percent level to a customer, on a surface area basis, and raises unnecessary questions about process control.

Although laminating methods which utilize a press on adhesive layer are presently employed in some areas of the marketplace, it is not considered a reliable or permanent bond for many markets. In particular, it is not desirable for architecture panels or outdoor exposed panels due to prior failures.

It is important that the coating has the necessary pencil hardness, that is surface scratch resistance, and also suitable bending capability. Coating hardness must be balanced against brittleness. A hard coating has an increased likelihood of splitting on the bend of a formed part. If the coating splits, the metal is exposed and there is likelihood of a corrosive failure at that spot.

In summary, it has been difficult to develop the necessary simultaneous properties for a commercial thermoplastic coating on a thick metal substrate at an economical cost. The coating needs the simultaneous capability of: developing suitable bonding to the metal substrate, economical production, having suitable pencil hardness, eliminating air entrapment, and having the ability to withstand a tight metal bend without splitting.

BRIEF SUMMARY OF THE INVENTION

The present invention is a laminating process which is directed toward economical production methods at scalable amounts of production which develop properties suitable for a broad based product line. In particular, the product is capable of important key components of commercial properties such as adhesion, scratch resistance, chemical inertness, eliminating air entrapment, and bending without failure.

BRIEF DESCRIPTION OF THE SEVERAL VIEWS OF THE DRAWING(S)

DETAILED DESCRIPTION OF THE INVENTION

The present invention is a laminating process that simultaneously creates desirable commercial products in a crystalline polyester film due to its unique position as an affordable engineered polymer. In particular, essential commercial characteristics of scratch resistance, bending toughness, and permanent adhesion are developed which are highly competitive to paint. Polyester is generally more affordable than other engineered polymers in the marketplace, and is chemically similar to many paints which are short chain polyesters admixed with cured epoxies.

When considering current pricing trends in thermoplastics, the better priced plastics tend to be polyethylene (high density, low density, linear low density), polystyrene, polypropylene, ABS, acetal homopolymer, and polyester (both PET and PBT). This is in reference to the types of polymer grades that are reasonably available in volume pricing that are extrudable at a commercial speed for a thermoplastic coating of around 1.0 to 1.5 mil thick. However, it has been found difficult to find satisfactory coating performance among many of the lower priced polymers, in particular, the polyolefins. Surface scratch resistance, in particular, has been elusive. The higher priced polymers, such as Acrylic, Fluoropolymers, Liquid Crystal Polymers, Polyamide/imide, Polyarylate, Polyetherimide, Polyetherketone, Polyphenylene Sulfide, Polysulfone, Cellulosics, Polycarbonate and Polyurethane are financially unappealing. Table 1 shows a rough affordability ratio for the same coating thickness on a price per pound when considering the polymer specific gravity. Although Table 1 could be shown as various ranges depending upon the polymer grades chosen, it is a rough average for a simplified view.

TABLE 1

| | |
|---|---|
| Polyethylene | 1.0 |
| Polypropylene | 1.1 |
| Polystryene | 1.2 |
| PVC | 1.2 |
| ABS | 1.3 |
| Polyester | 1.7 |
| Acetal | 1.8 |
| Polycarbonate | 2.3 |

Figure 1:
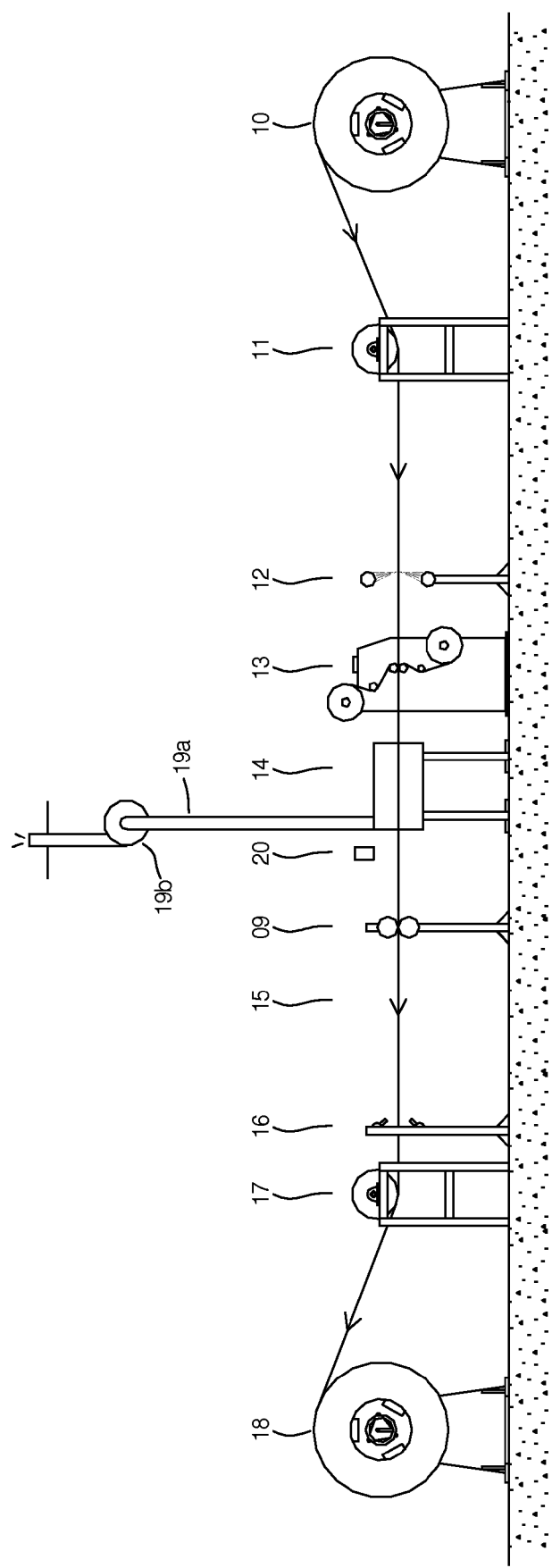
FIG. 1 shows a preferred embodiment commercial line of the present invention.

FIG. 1 shows a simplified commercial laminating line for a flat rolled metal substrate. A payoff reel 10 with an air brake pays off a metal substrate, passes under a deflector roll 11, and continues to a controlled natural gas—air premix burner 12 where the surface energy of the strip surface is raised to a minimum dyne level of 45. This minimum dyne level has been found necessary to create an initial bond between the metal and film, and also to prevent air entrapment between the film and metal surface. In a preferred embodiment, the dyne level is at least 55 for the best initial bond of film to the metal substrate. The surface to be coated is preferably free of debris, oils, water, and other liquids for proper adhesion. The metal surface is preferably conversion coated, pretreated, or coated with an organic primer, but these kinds of treatments are not required for proper adhesion. These kinds of pretreatments significantly enhance the ability of the metal to provide corrosion protection. The air brake provides back tension control for the line.

The air premix burner 12 also provides preheating of the metal to at least 200 degrees F. The preheat prepares the metal surface to receive the film without air entrapment, and also to establish an initial chemical bond with the film. In a preferred embodiment, the preheat is at least the melting temperature of the tie layer within the film, if one is used, or the softening point of the polyester film if a lower temperature tie layer is not used. It has been found that here has to be at least some bond established at the laminating nip that will carry over to the post treating step. The post treating step will then establish the final commercial adhesive bond.

In a preferred embodiment the air premix burner 12 is automatically regulated based on the line speed. This ensures that the line is capable of correctly controlling the preheat temperature for various changes that are needed, and to allow a higher production rate after initial settings are established at a lower speed.

A laminating station 13 provides preselected films for laminating to one or both sides of the metal substrate by a pair of nip rollers. The nip rollers press the films onto the metal substrate by use of a compressed air cylinder, hydraulic cylinders, screws, mechanical springs, or other mechanical means to create a force. The rolls are heated, but not so high as to cause the films to melt or to have a preferential adherence to the laminating rolls rather than to the metal substrate. If two films are applied, each side of the metal substrate may have a distinct film or the same film. In the normal case, the temperature of the rolls will generally be set to match the preheat temperature of the metal strip, but this is not a strict requirement. Some variance below or above the strip preheat temperature may be preferred, depending upon the type of film being laminated. However, the continuous strip feeding into the laminating nip will have a strong tendency to drive the laminating rolls to the strip preheat temperature, unless cooling or heating is provided. Cooling could be provided by backup rolls to the laminating rolls which are water or air cooled.

The metal-polymer laminate then proceeds to the post treating induction furnace 14 where the strip is heated to at least the melting point of the lowest melting layer polymer in either film. That is, if a two layer film is used, a tie layer that melts at 200° F. and a polyester layer that melts at 430° F., the metal-polymer laminate will be heated to at least 200° F. In a preferred embodiment, the metal-polymer laminate is heated to a point where all of the polymers are melted to ensure a complete bond of the polymers to each other and to the metal substrate. The exit temperature from the post treating step is carefully controlled by regulating the power to the heating induction coils and monitoring the exit temperature with a suitable sensor; such as an infra red sensor 20. Induction furnaces that are capable of heating metal strips are known in the art. A small amount of nuisance smoke is a likely occurrence from the polymer, and is readily removable by vent ductwork 19a with a suitable vent fan 19b. Alternately and equally, the strip can be heated by other means which include infra red, gas flame heating, convection, conduction, electrical resistance, and a gas fired furnace.

In another embodiment, the post treating heating rate is automatically regulated based on the line speed, optionally utilizing a curve that includes any efficiency effects that vary with the line speed. This ensures that the line is capable of correctly controlling the post treat temperature for various changes that are needed, and to allow a higher production rate after initial settings are established at a lower speed. For example, if an induction system is used, the power input is regulated based on line speed. If a gas fired system is used, the gas BTU input rate is varied with the line speed.

For the post treating operation, a direct flame impingement, or flame heating by close flame proximity has been found to be a viable embodiment of the present invention, but not without some trouble on the processing line. If the polymer is not carefully controlled to be inside the edges of the metal strip, the direct flame on the overhanging polymer is likely to cause melting or burning of the overhanging polymer. This can cause operational problems such as smoking, polymer dripping, and minor flames which may cause unsafe or unclean operational practices. However, by controlling the polymer film position within the width of the metal strip, and properly applying it in the laminating step to have initial adherence across the strip width, then the post treating by flame impingement will be satisfactory for at least some commercial applications. Even heating was found to be obtainable by this method, as observed by cooling effects of solidifying polymer that was relatively even and symmetric across the strip width.

The polymer metal laminate then proceeds to the exit cooling section 15 where cooling is allowed to take place either by natural convection or forced convection. In the present invention a crystalline polyester is used and the exit cooling section is designed to allow the crystalline structure to develop. In the exit cooling section, the polymer will solidify and cool down to the point where the crystalline structure develops and is well established. Air blowing devices 16, such as from compressed air nozzles, fans, and the like, can be employed to create a designed cool down rate for the metal polymer laminate (forced convection). An exit deflector roll 17 is used just prior to the winding reel 18. The cool down rate can be matched to the polyester used in order to enhance or contain the crystallinity to a satisfactory level to establish desired commercial properties. Generally, a higher amount of crystallinity is needed in order to develop a higher pencil hardness. It is the normal case to maximize crystallinity. However, for some markets, higher crystallinity may make the polymer brittle and may need to be balanced against the forming requirements for a particular application. The exit deflector roll 17 can be optionally utilized as a contact cooling roll by adding water cooling. Other cooling rolls could be added to create a designed cool down rate for the polymer.

Preheating the metal substrate prior the laminating above 350° F. provides suitable initial bonding from a process standpoint, but other factors begin to require consideration, such as economics and equipment capability. It is more expensive to operate laminating rolls in the higher temperatures, i.e., above 350° F. Their life is lower and their replacement cost is higher. Also, preheating the metal substrate above the melting point of a polyester film can cause the surface of the laminating rolls to heat up, and create a situation where the film begins to stick to the laminating rolls rather than the metal substrate. It is preferable to maintain the preheat temperature of the metal substrate below the melting point of the polyester film to avoid this complication. However, this is not a strict requirement. The polyester portion of the films tend to have melting points from 375 to 465° F., depending upon the type of film, as well as additives and mixtures added into the polyester portion. One embodiment of the present invention is to maintain the preheating of the metal strip below the melting point of the outside layer of the film. Another embodiment is to provide heating and cooling of the laminating rolls to allow any desired metal substrate preheat temperature above 200° F.

For many markets, a surface finishing pinch roll 09 with a designed surface finish is used to imprint a desired surface finish into the polymer surface while it is still in the melted state. The rolls are preferably water cooled, but can be cooled by other means such as air. The designed surface finish can be used to control the surface reflectivity, which in turn controls the surface gloss. This is a desirable outcome for some markets, in particular, where the gloss requirements are very low. Also, various desirable surface finishes can be imprinted such as anti finger print, matte finishes, highly reflective finishes, logos, or light embossed patterns. In general, the surface finish roll cools the polymer below the melting point to ensure the polymer does not stick to the surface finishing roll. Use of a surface finishing roll is an important embodiment of the present invention.

Figure 2:
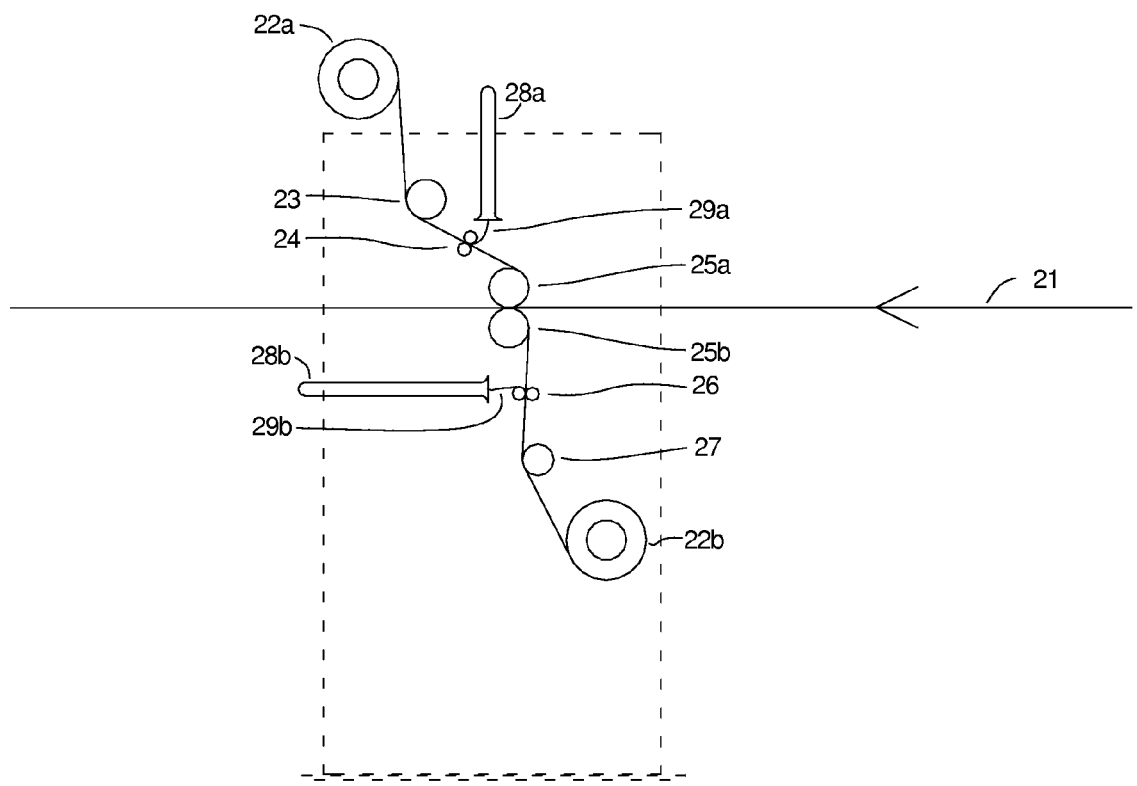
FIG. 2 shows a preferred embodiment of a laminating station.

FIG. 2 shows a close up of a preferred embodiment of a laminating station. A metal substrate 21 has already been pretreated and had the surface energy elevated as explained in FIG. 1. Film from an upper and lower film roll 22a,b passes over an idler roller, 23, 27 and then proceeds to a trimming station 24, 26 where one or both sides of the film is trimmed. This provides for matching the film width to the width of the metal substrate. The trimmings 29a,b from each side is vacuumed away in a vacuum removal tube 28a,b. This allows ordering films in lot sizes that are not the same as the metal substrate widths and provide for much better polymer inventory control. Every width in every possible color does not have to be stored. Also, the width of the film is established just prior to the nip rather than after the laminating step. It is a preferred embodiment to side trim the film just prior to the nip as it is less troublesome and more reliable to do it there. The knives may be score cut, razor cut, or shear slitting.

The film trimming knives 24, 26 may be moved to match the position of the metal substrate on the line if there is any off tracking from the line centerline. A metal substrate edge sensor may be employed to monitor any metal substrate off tracking, and reposition the knives to ensure the film edges match the metal substrate edges. In this case, positioning sensors are added to the knives or a ball screw is employed with a shaft encoder. Edge sensors include devices based on infrared light, capacitance, visible light, LED, air, CCV, lasers, and others. In a preferred embodiment, the substrate edge is sensed within 0.005" and the knives are positioned by a control system so that the film with is matched within 0.010" of the metal substrate. However, in commercial practice, a film to metal mis-match tolerance of up to 0.125" may be acceptable for some markets and is a minimum acceptable control.

In a commercial setting, it is preferable embodiment that the overall control of the film width and position is maintained so that there is very little film overhang or that the exposed metal does not exceed about 1/32 of an inch on either edge. In another embodiment, bare metal on the edge is commercially acceptable up to 1/8 of an inch.

It is an important embodiment of the present invention to be able to control the width of the film at the laminating process. The production of films can be a very expensive undertaking, relative to other operating costs, and the ability to match the width of the film is an important matter for best overall operating costs. Polymer films are expensive to make when they are thin, as the operation of a cast film line is generally a fixed amount per hour, and the width of the cast film then becomes an important factor. It is preferable to maximize the width of the film through the film maker in order to improve costs, especially when exact steel widths are unknown or difficult to predict. It is especially important not to undersize the film width for a particular order when running multiple widths on the cast film line with a single large width.

Figure 3:
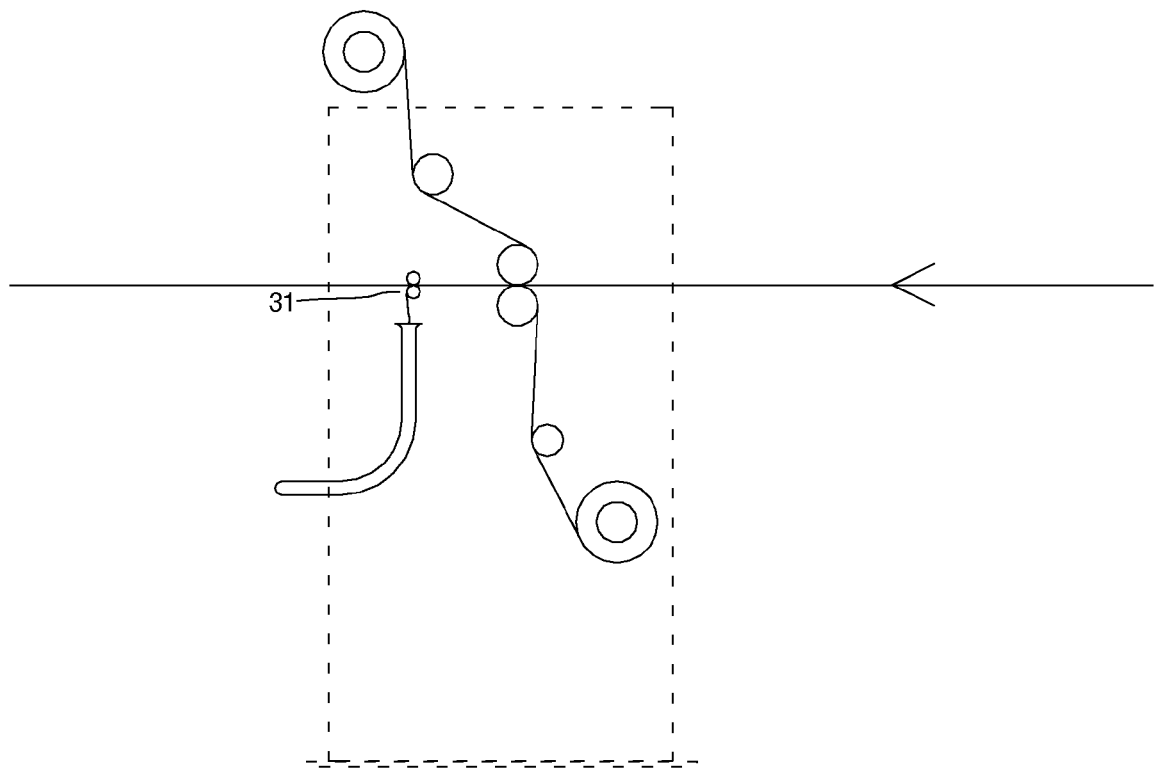
FIG. 3 shows another embodiment of a laminating station.

Though it is somewhat more troublesome, another embodiment of the present invention is to side trim 31 the film after the film has been pressed on to the metal substrate as illustrated in FIG. 3. If the control is carefully maintained, the knives will provide good stable cutting of the polymer only, with infrequent tracking up and onto the metal surface. It is preferable to reduce or avoid having the knives roll onto the strip, as the reliability is better due to difficulties with dulling or chipping of the knife edges.

Figure 4:
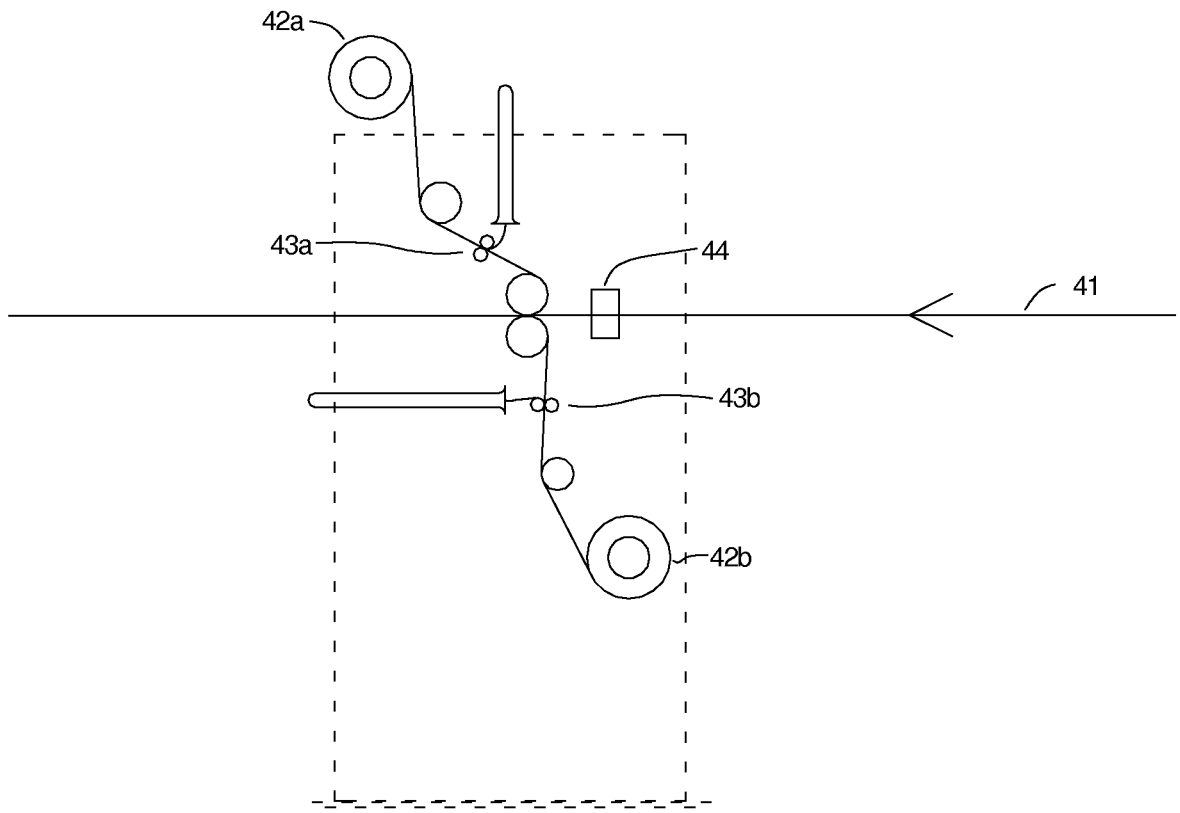
FIG. 4 shows an embodiment where the excess film is trimmed after lamination.

FIG. 4 shows another preferred embodiment of the present invention where the film roll positions are dynamically matched to the strip position. The metal substrate 41 is laminated by films from two unwind film rolls 42a,b which are optionally side trimmed by trimmers 43a,b. The edge position of the metal substrate is detected by an edge sensor 44 which allows a mechanical control system to move one or both of the film unwind film rolls 42a,b to match the position of the film edge. If the optional side trimmers 43a,b are utilized, they are optionally moved to match the position of the metal substrate edge position. The movement of the trimming knives would depend upon whether there was sufficient width of the film to trim. Generally, if the trimmers are utilized, it is preferable for them to move with their respective unwind film roll to keep the control simplified.

The edge sensor 44 utilizes an infra red, other light type, capacitance, compressed air, or a mechanical style. The sensor may be analog, digital, or an on/off style such as a photoelectric sensor. An Infra red sensor may be preferable for some polymers where good penetration through the polymer is achievable and capacitance is preferable for others. Routine experimentation is likely to be required to identify a reliable sensor for a particular polymer, color, and polymer thickness. It is preferable that the sensor does not touch the metal or polymer, but this is not a requirement.

An embodiment of the present invention is to move both unwind film rolls by a single metal edge sensor. This provides a way to simplify the control system and ensure that the film rolls are aligned to the metal substrate. A single frame that includes any film supporting rolls as well as the film rolls can be moved to track any metal edge variance. The frame motion needed to follow the strip edge will only be a fraction of the actual line speed, that is the metal strip speed. The frame motion will only need to be about 2% or less of the line speed for good control. In a preferred embodiment, a control system will have a variable speed adjustment.

In a preferred embodiment, the bonding of the film to the metal substrate is by a chemical bond. The process design is set up around utilization of compounds that include maleic anhydride, acrylic acid, glycol, or an acrylate group. Commercial polymers that are useful in tie layers include, but are not limited to, Bynel (E.I. Du Pont De Nemours, Wilmington, Del.), Admer (Mitsui Chemicals America, Inc., Rye Brook, N.Y.), Plexar (Equistar Chemicals LP, Houston, Tex.), PETG (Eastman Chemical Company, New York, N.Y.), and Amplify (Dow Chemical Company, Midland, Mich.). In particular, a maleic anhydride grafted polyethylene has found to be very successful at developing the necessary bonding to metal at relatively low amounts of at least 1/4 percent by weight in a tie layer. A typical tie layer that can be successfully co-extruded and provide bonding between the metal and polyester is an anhydride-modified ethylene acrylate. Ethylene based tie layers are preferred rather than polypropylene based tie layers which have been found to be poorly adhering to polyesters.

In one embodiment of the present invention, a terpolymer is utilized as a tie layer. It has been found that a tie layer with both an anhydride functionality and an acrylate functionality will provide superior bonding between metal and the polyester film.

The post treating step ensures that the process provides a reliable commercial bonding between the polyester film and the metal substrate. However, a number of laboratory measurements of suitable commercial bonding after the laminating step without post treating were observed. Adhesion values at or above 43 ounces per inch width as measured by a cross hatch adhesion test were observed. It is understood that the preheat of the metal is sufficient to cause the tie layer to melt at the laminating nip, if a tie layer is used, and cause the tie layer to become very chemically active for bonding purposes. The present invention is designed to ensure the reliability of the lamination process by including a post treating step in the coating process. However, based on laboratory measurements this is not a requirement in order to create a coating that has adhesion at a commercial level.

For the purposes of this patent application,
i) a coating with an adhesion value of at least 43 ounces per inch width is interpreted as a classification of 4 or 5 by ASTM test method D3359 using a tape with an adhesion level of 43 ounces per inch. If there is an initial failure on a measurement immediately after production on the processing line, a second measurement is made 24 hours later after cooling down to ambient temperature. A passing test on either adhesion test is considered an adhesion value of at least 43 ounces per inch width.
ii) a coating that has continuity of at least three metal thickness bending radius without metal exposure means that the metal polymer laminate does not split open so that metal exposure can be seen either by the naked eye or by magnification up to 100×. The radius bend is made by carefully and slowly bending the metal substrate in a tight radius so that the bending curve is substantially round. The radius is measured to the inside metal surface of the bending radius at three thickness and higher, that is, three thickness and bending radius that are greater. Orange peel textures or localized thinning of the polymer on the radius is normal and is not considered a failure.
iii) a coating with a pencil hardness of a minimum of 2 B means 2 B or harder as measured by ASTM test method D3363.

The present invention has advantages in chemical inertness. Polyesters, even in thin films of 0.003" and less, have significant corrosion resistance capabilities. Based on comparable salt spray results of U.S. Pat. No. 7,279,225, among others, it is understood that a polyester inherently is very capable of withstanding corrosive commercial requirements. Based on additional visual inspection of failures in a salt spray environment, where failures occur due to undercutting of the coating (i.e. edge creep) and not due to porosity in the coating or a coating integrity failure, there is strong evidence of polyester's chemical resistance in a thin coating on a metal surface. Coating continuity, therefore, on a bend is a highly important aspect for maintaining corrosion protection on a formed part.

Figure 5:
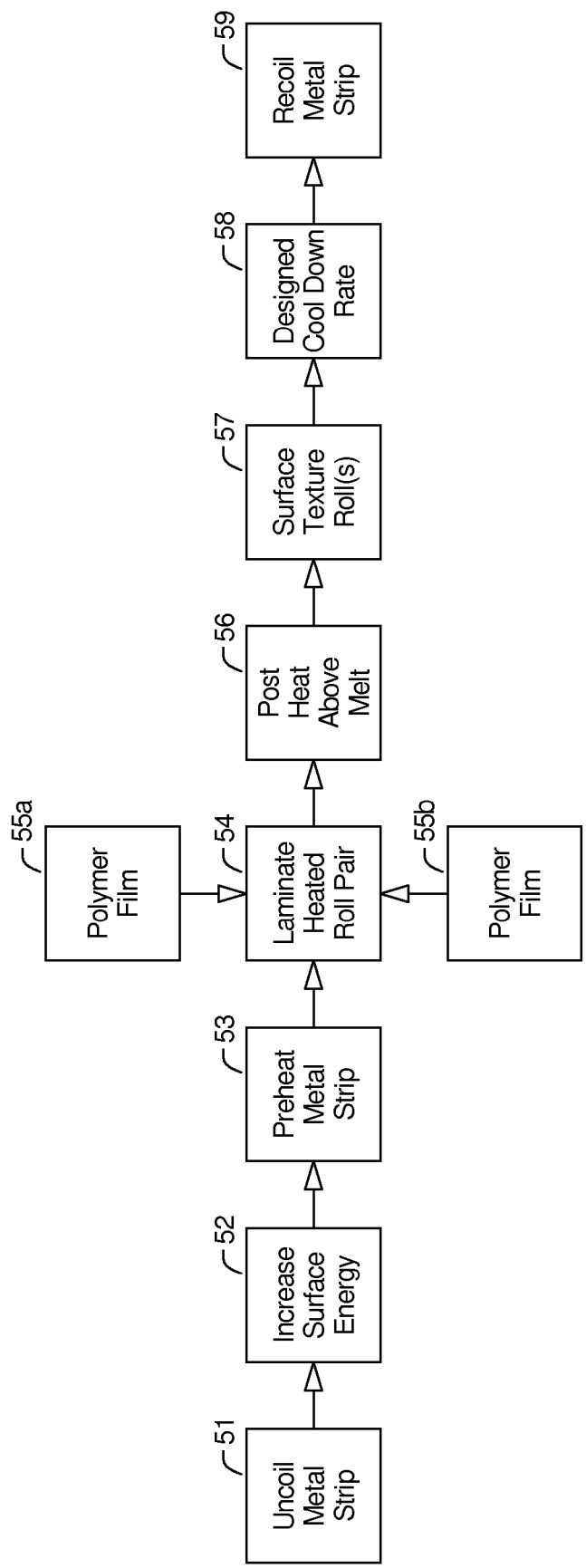
FIG. 5 shows a general embodiment of the present invention.

FIG. 5 is a more generalized expression of the present invention. Each step will now be described.

Step 51: Uncoil strip—standard continuous (batch coil to coil or welded with inline strip storage) flat rolled strip.

Step 52: The surface energy of the metal strip surface to be coated is increased by a controlled flame (i.e. air to gas ratio is controlled), corona, or plasma. The surface energy is raised to a minimum dyne level of 45. The present invention has found that utilization of this kind of pretreatment avoids difficulties reported by others with air entrapment. No air entrapment of any kind was observed at the laminating speeds seen, even when examined closely under a microscope.

Step 53: The metal strip is preheated to a temperature of 200 to 400 degrees F. Acceptable methods that can be used include, but are not limited to, are: flame fired oven, infrared oven, direct flame impingement, nearly direct flame impingement, convection oven, induction furnace, electric resistance heating, electric heating coils, gas fired furnace, and radiant heating. The present invention has found that utilization of preheating is necessary in order to avoid air entrapment between the metal surface and film. This step can be done simultaneously with step 52 if a flame is used.

Step 54: Laminate at least one side of the metal strip by use of a roll pair. One roll is optionally heated by a control loop. The preheated strip will heat the rolls anyway and the heated roll avoids startup issues. The width and position of the film must match the position of the metal strip. A second roll pair is utilized, if desired, for laminating a second film in sequence to the first pair. If a second roll pair is utilized, an additional surface pretreatment is utilized to ensure the surface energy of the second side to be laminated is elevated, as well as a heater if needed to obtain the proper preheat temperature at the second roll pair.

Step 55a,b: Film—at least one is predominately polyester, that is, 50% by weight. Tie layers, colors, and various additives necessary for color dispersion may be added to the polyester which would lower the percentage by weight. Also, admixed compounds that increase pencil hardness, provide surface lubrication, provide better processing, provide UV resistance, or create desired gloss are optionally added.

Step 56: The metal-polymer laminate is post heated, preferably by induction heating furnace, above the melting point of the polyester. Equally, the post heating is done by flame fired oven, infrared oven, direct flame impingement, nearly direct flame impingement, convection oven, induction furnace, electric resistance heating, electric heating coils, gas fired furnace, and radiant heating. An infrared sensor is preferably installed to monitor the exit temperature to ensure proper control.

Step 57: After the post treating step, a surface finishing step is applied to one or both surfaces of the polymer if needed for the markets the metal-polymer laminate is being sold to. A pinch roll is preferably used to apply a surface finish while the polymer is still in the melted state. The surface finish transfer is a near duplicate copy of the roll finish. The rolls are cooled to ensure the polymer does not adhere to the rolls, but the metal-polymer laminate is maintained at a high enough temperature to allow the proper cool down rate and timing to develop the desired crystalline structure. An alternate method is to utilize a continuous belt, but this is somewhat less preferable as it is often difficult to create a good belt splice that is not visible. However, a belt is desirable for ease of switching between finishes.

Step 58: After the post treating step, a cool down rate is performed that allows the polyester film to achieve desired crystallinity. For most markets, the maximum amount of crystallinity will be desired. However, in some markets, the amount of crystallinity may be lower than the maximum in order to improve flexibility and forming.

Step 59: After the cool down step, the metal-polymer laminate is recoiled at a temperature that will not cause problems with lap to lap shrinkage or slippage. Generally, temperatures less than 150 degrees F. are preferred to ensure there are no winding or storage problems.

An important and significant improvement of the present invention is to utilize equipment inline to improve the surface energy of the metal substrate prior to the laminating nip step. Such equipment is a controlled flame (i.e. air to gas ratio is controlled), corona, or plasma. The surface energy is preferably raised to a minimum dyne level of 45. The present invention has found that utilization of this kind of pretreatment avoids difficulties reported by others with air entrapment. However, it must be used in combination with a preheating of the metal substrate to at least 200 degrees F., and preferably 250 degrees F. As a result, no air entrapment of any kind was observed, even when examined closely under a microscope. It is believed that the combination of preheat and surface energy allows the film to instantly "wet out" and initially adhere to the metal substrate. This pretreating method works very well for a metal surface, a conversion coated surface, an organic coated surface, or even a surface that has a prior polymer coating.

Elimination of air entrapment between the film and metal substrate avoids the entrapped air from expanding in the post treat operation. If the entrapped air bubble is significant in size, it can expand enough to rupture through the film surface and allow metal exposure. Even if it is not large enough to allow metal exposure, it may be large enough to cause coating thinning and then lower the corrosion protection at the spot of the entrapped air. The substantial elimination of entrapped air is an important result of the present invention.

As conceived in the present invention, air entrapment is not related to the laminate nip roll pressure. In the examples following, only a very light laminating force was used with light laminating springs which were opened by rotating a hand knob. Higher line speeds are obtainable, therefore, without concern for problems observed by others.

It is preferable to have the cooling rate after the post heater designed to maximize the amount of crystallinity in the polyester. The exact cool down rate will be polymer dependent. A semi-crystalline PBT, for example, has been found to need only three to five seconds at a temperature range of 150 to 180 degrees F. to develop its nearly fully crystalline structure in the thin coatings of the present invention. That is, to develop the crystalline structure that it is capable of developing.

For the purpose of this invention, crystallinity is measured by a Differential Scanning calorimeter (DSC) as is known in the art. The amount of crystallinity is determined by the energy absorbed in the polymer. To determine the percent of crystallization, a highly crystalline form of the polyester is used for comparison as is known in the art. In the case of a blend of PBT/PET, an average must be used.

One embodiment is to utilize a crystalline polyester which rapidly reaches a high level of crystallization, at least 50%, within 5 seconds in the post treating step of the extrusion coating process. It is preferred that the crystalline polyester has a high content of crystallinity in the film prior to lamination. After post treat and cool down, a minimum amount of crystallization is 25% as measured by a DSC, but preferably it is over 50% in order to reach the desired pencil hardness levels of 2 B or harder.

In some cases, it is desirable to have strip storage for longer processing runs of multiple coils rather than thread each individual coil. The line may be stopped for each coil and the coil ends welded together, as is common in coil processing lines, and a looping tower or looping coil car employed. Such technology is known in the art. Also, a strip splicing or joining method may be employed with success, such as a stitching/stamping method as by Behlen Manufacturing Company (Columbus, Nebr.). Any downstream rolls with a narrow or closed gap, such as pinch rolls, may be opened briefly to let the splice pass through to avoid damage. Generally, splices do not affect or damage idler rolls in a coating operation provided proper care is taken. The pressure from the splice onto the rotating rolls does not cut into rolls provided the rolls are sufficiently tough. A disadvantage of adding looping towers to the line is the additional capital cost and lengthening the amount of threaded strip in the line. For higher speed lines, 200 fpm and above, strip storage provides important production advantages.

It is desirable to have the ability to continuously run multiple rolls of film in sequence without stopping if metal strip storage is added to the laminating line. In this case, the ability to switch over to films of different colors and widths is a distinct production advantage. This adds capital cost and operational complexity to the laminating line, but it also provides an overall lower operating cost and a better operation. It is not appealing to stop a line in the middle of a run for the sake of starting a new film roll, as a customer will find yield losses and off specification material objectionable in a finished coil. A new film roll can be spliced to a previous running coil "on the fly" by methods known in the art, by taping ends of coils together without the use of looping towers or coil cars. In fact, it is less desirable to add looping towers to a processing line to make the processing of steel coils continuous if the rolls of film are not continuous as well.

Figure 6:
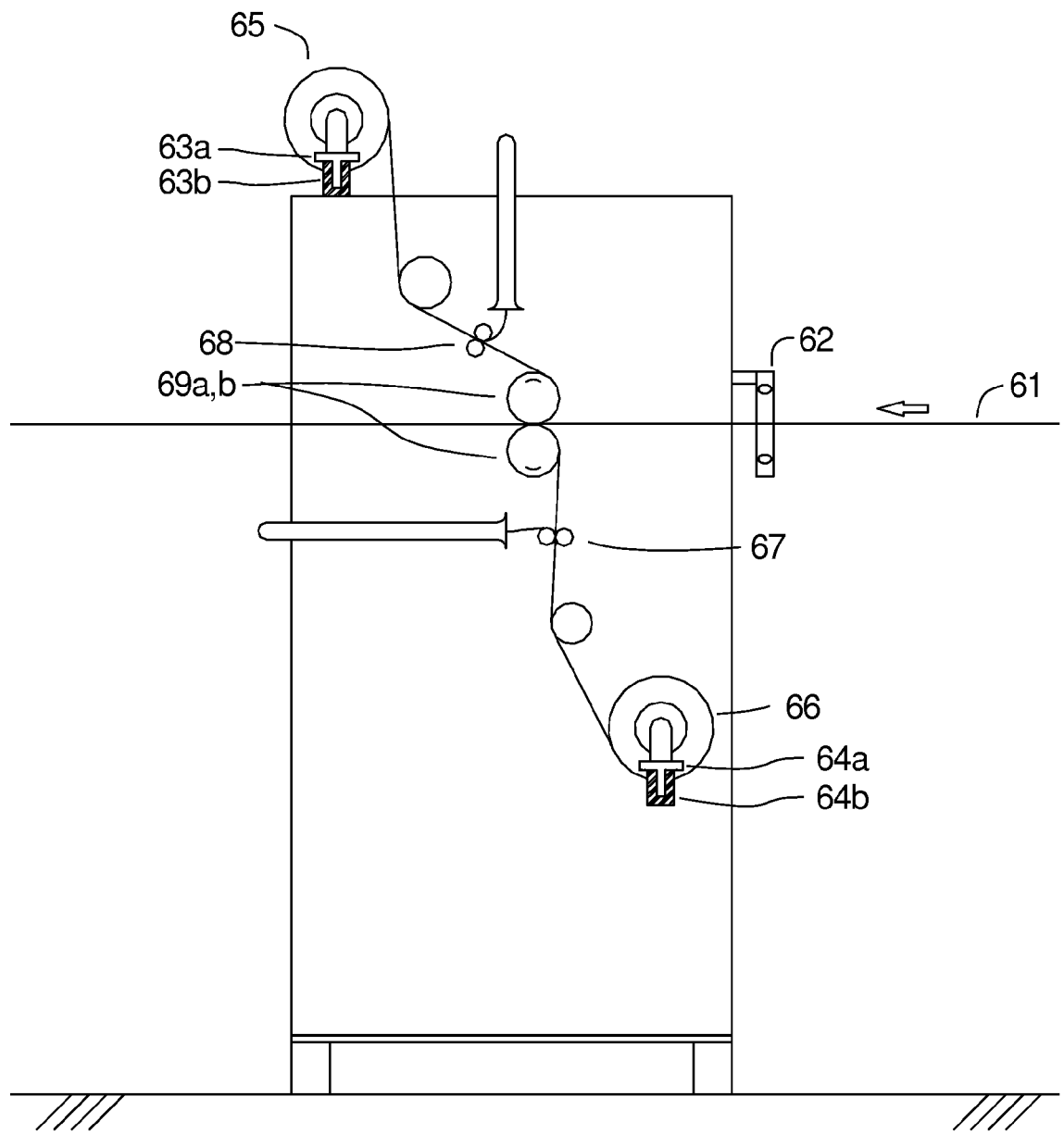
FIG. 6 shows an embodiment where the film roll(s) will be positioned to track the position of the metal strip.

FIG. 6 shows an important embodiment of the present invention. An edge sensor 62 monitoring the metal strip 61 to be laminated is used to position the upper and lower films going into the laminating roll pair 69a,b. The positioning of the films is done by positioning the upper film roll 65 by use of an upper T rail 63a and slide channel 63b where the entire film roll 65 is moved. Similarly, the lower film roll 66 is positioned by use of a lower T rail 64a and slide channel 64b. Preferably, both the upper and lower film rolls are moved by use of one edge sensor, however, two separate edge detecting sensors may be used. The upper and lower film rolls may be moved by one actuator, such as a hydraulic cylinder, air cylinder, or motor. The edge positioning circuit will move slowly, at a top speed of less than 2 percent of the line speed in order to prevent wrinkles from forming in the film and to ensure stable tracking operation.

The mechanical film positioning system matches the film position(s) to the strip position in the event the strip off tracks during the coating operation. A second optional sensor, not shown, can be used to position the side trimming knives 67,68 on the second strip edge to ensure the film width matches the strip width. In this manner, the film can be positioned to match the strip position if it is the same width, or the film is additionally trimmed on one side if it is wider than the strip. In a normal operation, the strip width is known and the film side trimming knives 67,68 may be appropriately positioned by use of a scale or electronic position indicator. The positioning and sensing tolerances of FIG. 6 are the same as already discussed in FIG. 2.

Figure 7:
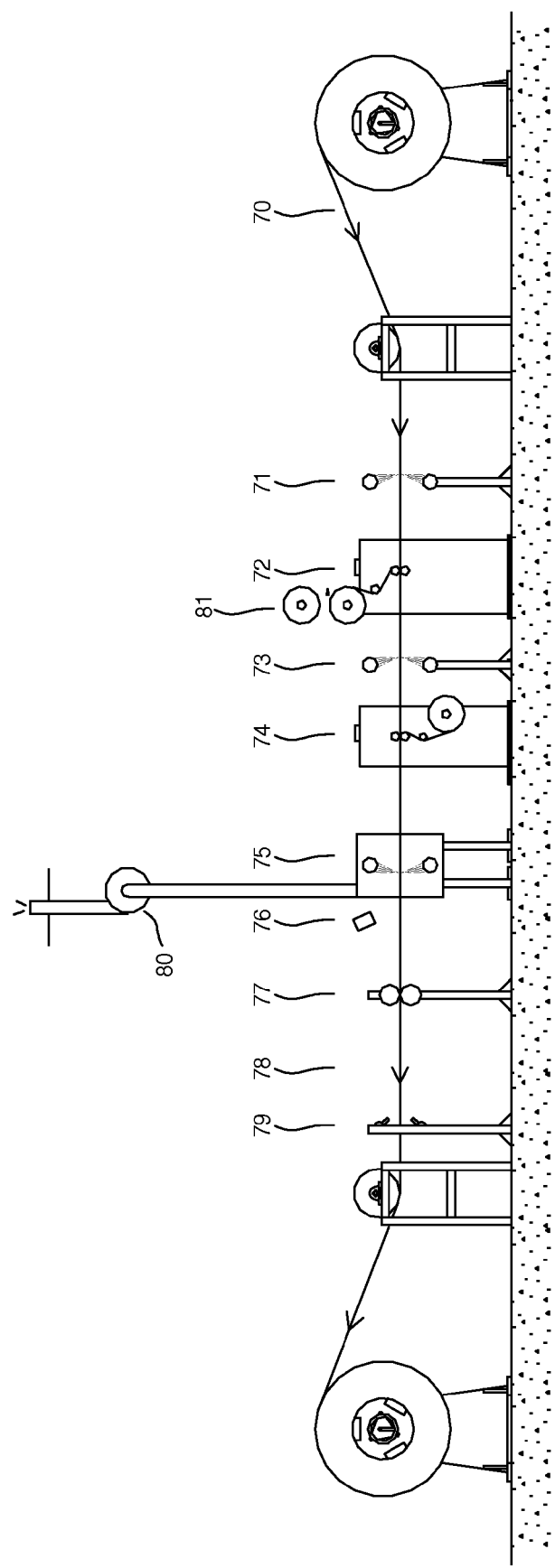
FIG. 7 shows another preferred embodiment commercial line of the present invention.

FIG. 7 is another embodiment of the present invention that is very similar to FIG. 1 for a flat rolled metal substrate. A metal substrate 70 pays off an unwind reel and is surface pretreated and preheated by gas fired burners 71 to a controlled temperature. The metal substrate then goes through a first laminating step 72 where a film is pressed against the top major surface of the metal substrate by a top roll. The metal substrate then passes through two optional second steps of pretreating-reheating 73 by a gas fired burner and a second laminating step 74. The pretreating-reheating may be fired at a high enough rate to reheat the metal substrate if it has cooled down too far prior to the second laminating step. The second laminating step presses a second film against the opposite major surface of the metal substrate by the lower roll. The second film may be the same as the first film or it may be a different film. Depending upon the market, some products may only require a simple "backer" type of film where high performance is not required. In this case, a polyester film may not be required and a polyolefin may be utilized, such as polypropylene or polyethylene. In other cases, the polyester may be on one side and a very high performance film may be utilized on the other side such as a PVDF film or a polycarbonate.

A post treating operation by a direct impinging or direct fired gas fired flame 75 is utilized in combination with an exhaust system 80 to capture any nuisance smoke. An infrared temperature sensor 76 monitors the temperature of the polymer-metal laminate as it exits the post treating step. An optional surface finishing roll step 77 is utilized. A designed cool down section 78 provides the needed crystallinity in the final polymer-metal laminate. An air blow off system 79 may be utilized if necessary to provide forced air cooling in the designed cool down section 78. The air blow offs 79 are preferably movable and locatable anywhere in the cool down section 78.

A double roll 81 of film is shown for ease of splicing two rolls onto the top side of the metal substrate. The two rolls of film are preferably spliced together dynamically while the metal substrate is moving so that there is no line stoppage when switching between films. An automatic system of splicing utilizing two sided tape is provided as is known in the art. In this manner, colors, widths, and film types can be readily changed when orders change or when one roll of film runs out. On the fly film splicing improves line economics as already discussed. Both top and bottom film splicing can be done, even though only the top roll of film is illustrated.

The present invention is generally conceived as a one or two sided coating process. It is preferably performed in a single pass for best line and operational efficiency. However, one side at a time could be coated under some circumstances by choice, if equipment were not functional, or if multiple layers of film were to be placed on top of each other. Under such circumstances, the present invention could be adapted to the situation by uncoiling the metal substrate, pretreating the appropriate side(s), preheating, laminating, optionally post treating, cooling, and winding up on a winding reel. Then the work in progress coil would then be uncoiled a second time, and coated with film according to the teachings of the present invention through a processing line a second time on one or both sides. Also, multiple films could be laminated in sequence on the same side by use of multiple pretreating, preheating, and laminating steps prior to post heating by adapting the teachings of the present invention.

As another embodiment of the present invention, multiple film widths can be applied simultaneously to the metal substrate with a gap separating them. This is an important embodiment for some markets where parts will be cut out and bare metal areas will be needed for welding. In particular, a three piece can body with a side welded seam may pre-coated on a wide metal tinplate by coating multiple film widths that are separated by a small gap, such as a ¹⁄₁₆ and up to ¾" wide. The films could be split from a single film which is slit on line and separated by gapping methods, or several films could be mounted and gapped.

Example 1

A metal strip 0.009" thick galvanized steel was run on a line configured similar to FIG. 1 with the exception that an impinging flame was used as a post treat rather than an induction furnace. A 1.5 mil two layer film was applied comprising: a semi crystalline polyester PBT with a white color, and a tie layer primarily composed of an anhydride-modified ethylene acrylate tie layer. The ratio of the tie layer to the bulk layer was approximately 1:4. The Metal strip was preheated to approximately 300 degrees F. and post treated to between 510-520 degrees F. after lamination. The laminator rolls were heated to 400 degrees F. and the line speed was operated at 20 feet per minute. No forced air cooling was applied to the metal-polymer laminate. After post treating the metal strip stayed molten for approximately 22 seconds, solidified, and then cooled for an additional 9 seconds before contacting the exit deflector roll where the large roll acted as a heat sink and rapidly cooled the metal-laminate to ambient temperature. The metal strip exhibited all the desired commercial properties of: adhesion over 43 ounces per inch based on a cross hatch adhesion test (using a 3M 610 tape), bending toughness at a one metal thickness without metal exposure, and a pencil hardness of HB.

Example 2

A metal strip 0.010" thick galvanized steel was run on a line configured as in example 1. A 0.6 mil two layer film was applied to one side of the metal strip comprising: a semi crystalline polyester PBT without color, and a tie layer primarily composed of an anhydride-modified ethylene acrylate tie layer. The ratio of the tie layer to the bulk layer was approximately 3:17. The Metal strip was preheated to approximately 300 degrees F. and post treated to between 440-450 degrees F. after lamination. The laminator rolls were heated to 400 degrees F. and the line speed was operated at 12 feet per minute. No forced air cooling was applied to the metal-polymer laminate. The metal strip exhibited all the desired commercial properties of: adhesion over 43 ounces per inch based on a cross hatch adhesion test (using a 3M 610 tape), bending toughness at a one metal thickness without metal exposure, and a pencil hardness of 2 B. Over 500 feet of continuous steel was run coated 18" wide with polymer in a continuous length with a surface free of defects that would be completely acceptable in the marketplace.

Example 3

A metal strip 0.010" thick galvanized steel was run on a line configured as in example 1. Two films were applied to the metal strip. A 0.6 mil two layer film was applied to one side of the metal strip comprising: a semi crystalline polyester PBT without color, and a tie layer primarily composed of an anhydride-modified ethylene acrylate tie layer. The ratio of the tie layer to the bulk layer was approximately 3:17. The other side received a 0.6 mil two layer film comprising: a highly crystalline polyester PBT with a white color utilizing TiO2, and a tie layer primarily composed of an anhydride-modified ethylene acrylate tie layer. The ratio of the tie layer to the bulk layer was approximately 3:17. The Metal strip was preheated to approximately 300 degrees F. and post treated to between 440-450 degrees F. after lamination. The laminator rolls were heated to 400 degrees F. and the line speed was operated at 15 feet per minute. The metal-polymer laminate was allowed to air cool. The metal strip exhibited all the desired commercial properties of: adhesion over 43 ounces per inch based on a cross hatch adhesion test (using a 3M 610 tape), bending toughness at a zero metal thickness without metal exposure, and a pencil hardness of 2 B for the clear and HB for the white color. Over 500 feet of continuous steel was run coated 18" wide with polymer in a continuous length with a surface free of defects that would be completely acceptable in the marketplace. The line could clearly have been operated for a longer period, but operation was chosen to be stopped as a steady state operation was clearly achieved.

Example 4

A metal strip 0.010" thick galvanized steel was run on a line configured as in and post treated per example 3. Two films were applied to the metal strip in a similar arrangement and operation as example 3. An 0.8 mil was applied to each side with a white color similar to the white color film of example 3. The metal strip exhibited all the desired commercial properties of: adhesion over 43 ounces per inch based on a cross hatch adhesion test (using a 3M 610 tape), bending toughness at a zero metal thickness without metal exposure, and a pencil hardness of HB. Over 500 feet of continuous steel was run coated 18" wide with polymer in a continuous length with a surface free of defects that would be completely acceptable in the marketplace.

Example 5

A metal strip 0.010" thick galvanized steel was run on a line configured as in and post treated per example 3. Two films were applied to the metal strip in a similar arrangement with the only difference being the thickness and color of the films. An 0.8 mil PBT was applied to one side and a 0.6 mil PBT was applied to the other. The metal strip exhibited all the desired commercial properties of: adhesion over 43 ounces per inch based on a cross hatch adhesion test (using a 3M 610 tape), bending toughness at a zero metal thickness without metal exposure, and a pencil hardness of HB. Over 500 feet of continuous steel was run coated 18" wide with polymer in a continuous length with a surface free of defects that would be completely acceptable in the marketplace.

Example 6

Two different metal strips were run on the line configured as follows: strip 1 was a 0.010" thick G30 galvanized steel strip 18" wide and strip 2 was a 0.015" thick G30 galvanized steel strip 24" wide. The line speeds for both strips were 12 to 25 feet per minute. The preheat temperature range of the metal strips were between 305° F. to 350° F. The post heat temperature range was observed between 420° F. to 440° F.

Example 6 continued. For Strip 1, a 0.6 mil PBT clear film was applied to one side and a 1.0 mil PBT white color was applied to the other side. The white color film was split into five film widths with gaps of ¹⁄₁₆, ½", 1, and 2". Strip 2 was similarly coated to its full width.

Example 6 continued. The pencil hardness for strip 1 was 2 B on the clear color, and strip 1 passed the zero T bending test with 100% continuity and passed the cross hatch adhesion test (using a 3M 610 tape). The pencil hardness for strip 2 was HB to H on the white color, and strip 2 passed the zero T bending test with 100% continuity and passed the cross hatch adhesion test (using a 3M 610 tape).

Example 7

Gloss reduction. A surface sandpaper of 400 grit finish was simultaneously applied to both sides of a small sample of polymer to demonstrate the ability of the polymer to lower the gloss by altering the surface finish of the polymer. For the samples, a 0.6 mil two layer tie layer/PBT clear film was applied to one side and a two layer 1.5 mil tie layer/PBT white color was applied to the other side. Two polymer samples were prepared by melting them above the melting point of the PBT. While still in the melted state, the samples were passed through a nip roller with the sandpaper where the grit finish was impressed upon the polymer surface to a near perfect replication. The polymer coated samples also immediately cooled below the melting point of the film in the nip roller and did not adhere to the sandpaper. A gloss (60 degree) measurement of the polymer surface obtained readings of 6-8 gloss units. Prior to the alteration of the surface finish, the gloss readings were 35-40 gloss units.

Example 8

Gloss control comparison. A cooling roll with a surface finish averaging approximately 8 micro inches was used to develop a white film for laminating which was applied to the surface of a galvanized metal substrate as described in example 1 with the exception that a post treat temperature was utilized well below the melting point of the PBT, at approximately 200 degrees F. The surface finish of the film was therefore substantially unaltered through laminating and post treating. The polymer coated strip was allowed to cool by convection naturally on the processing line and coiled. Gloss (60 degree) measurements of the white color polymer surface obtained readings of 60-65 gloss units.

All of the above examples were run without any visible air entrapment between the metal substrate and the film. Air entrapment was not visible even when viewed under magnification capable of seeing bubbles as small as 0.5 micron in diameter.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

We claim:

1. Processing steps for laminating a metal substrate with a thin thermoplastic polymer film to create desirable simultaneous commercial properties comprising:
   a. uncoiling a metal substrate from a coil on a processing line,
   b. wherein said metal substrate is flat rolled,
   c. increasing the surface energy of a first major side of said metal substrate to a dyne level of at least 45,
   d. preheating said metal substrate to at least 200 degrees F.,
   e. preselecting a first film for bonding to said first major side,
   f. pressing said first film onto said first major side by use of a first roll,
   g. utilizing a first chemical bond for adhering said first film to said first major side thereby creating a metal polymer laminate,
   h. wherein said first film comprises at least 50% thermoplastic polyester by weight,
   i. wherein said polyester is PET, PBT, or a mixture of PET and PBT,
   j. wherein said first film is a maximum of 0.003 inches thick,
   k. wherein said first film comprises at least one layer,
   l. post treating said metal polymer laminate by heating said metal polymer laminate to at least the lowest melting point of any polymer in said first film, and
   m. cooling said metal polymer laminate to below 150 degrees F. for coiling into a finished coil, and n. wherein said cooling of said metal polymer laminate creates crystallinity in said first film according to a predetermined criterion, whereby said finished coil has said desirable simultaneous commercial properties comprising:
- o. coating continuity of at least three metal thickness bending radius without metal exposure,
- p. bonding of said first film onto said metal substrate of at least 43 ounces per inch after said cooling,
- q. a minimum pencil hardness of 2 B.

2. The processing steps according to claim 1 wherein the following steps are optionally done prior to said post treating of said metal polymer laminate:
- r. additionally heating said metal polymer laminate to at least 200 degrees F. if necessary,
- s. increasing the surface energy of the second major side of said metal substrate to a dyne level of at least 45,
- t. preselecting a second film for bonding to the second major side of said metal substrate,
- u. pressing said second film onto the second major side by use of a second roll,
- v. wherein said second roll is
  - i. opposite of said first roll to create a roll nip, or
  - ii. a selected distance sequentially after said first roll,
- w. utilizing a second chemical bond for adhering said second film to the second major side,
- x. wherein said second film comprises at least one layer, and
- y. wherein said second film is a maximum of 0.003 inches thick.

3. The processing steps according to claim 2 wherein any said film is trimmed to substantially match the width of said metal substrate prior to being pressed against said metal substrate.

4. The processing steps according to claim 3 wherein any metal exposure is no more than 1/8 of an inch from the metal substrate edge.

5. The processing steps according to claim 2 wherein any said film is moved to match the position of said metal substrate on said processing line, and the movement speed of any said film is 2 percent or less of the lengthwise speed of said metal substrate on said processing line.

6. The processing steps according to claim 2 wherein the crystallinity of any said polyester is maximized by timing said cooling of polymer metal laminate.

7. The processing steps according to claim 2 wherein any said increasing of said surface energy and preheating of said metal substrate is simultaneously done by a controlled flame.

8. The processing steps according to claim 2 wherein a surface texture roll is applied to either major side of said metal polymer laminate just prior to said cooling.

9. The processing steps according to claim 8 wherein the surface texture alters the gloss of the polymer or creates a desirable commercial texture.

10. The processing steps according to claim 9 wherein said desirable commercial texture includes anti finger print, matte finishes, highly reflective finishes, logos, and embossed patterns.

11. The processing steps according to claim 2 wherein any said chemical bond is created by use of an anhydride, acrylic acid, glycol, or an acrylate molecular group.

12. The processing steps according to claim 2 wherein a terpolymer is utilized as a tie layer for said first film and said terpolymer has both an anhydride functionality and an acrylate functionality.

13. The processing steps according to claim 2 wherein said crystallinity is at least 50% when compared against a highly crystalline form of said polyester.

14. The processing steps according to claim 2 wherein no visible air bubbles are entrapped between any said film and said metal substrate at a size greater than 0.5 microns.

15. The processing steps according to claim 2 wherein at least one of the group comprising i) said first roll and ii) said second roll is heated to a controlled temperature.

16. The processing steps according to claim 2 wherein said processing line includes strip storage to allow coils to be spliced together inline.

17. The processing steps according to claim 2 wherein any said pretreating is automatically regulated based on the lengthwise speed of said metal substrate on said processing line.

18. The processing steps according to claim 2 wherein any said preheating is automatically regulated based on the lengthwise speed of said metal substrate on said processing line and includes any efficiency effects that vary with the lengthwise speed of said metal substrate on said processing line.

19. The processing steps according to claim 2 wherein said post treating is automatically regulated based on the lengthwise speed of said metal substrate on said processing line and includes any efficiency effects that vary with the lengthwise speed of said metal substrate on said processing line.

* * * * *

UNITED STATES PATENT AND TRADEMARK OFFICE
CERTIFICATE OF CORRECTION

PATENT NO. : 7,942,991 B1
APPLICATION NO. : 12/388011
DATED : May 17, 2011
INVENTOR(S) : Mark V. Loen and James E. Velliky It is certified that error appears in the above-identified patent and that said Letters Patent is hereby corrected as shown below:

In the Specifications:

Col 4, Line 59: after "minimum dyne" insert --/cm--;

Col 4, Line 59: after "This minimum dyne" insert --/cm--;

Col 4, Line 62: after "embodiment, the dyne" insert --/cm--;

Col 9, line 66: after "a minimum dyne" insert --/cm--;

Col 11, line 4: after "a minimum dyne" insert --/cm--;

In the Claims:

Claim 1(c), col 16, line 47: after "metal substrate to a dyne" insert --/cm--;

Claim 2(s), col 17, line 19: after "metal substrate to a dyne" insert --/cm--.

Signed and Sealed this
Twenty-first Day of May, 2013

Teresa Stanek Rea
*Acting Director of the United States Patent and Trademark Office*